(12) United States Patent
Lee et al.

(10) Patent No.: US 11,694,303 B2
(45) Date of Patent: Jul. 4, 2023

(54) METHOD AND APPARATUS FOR PROVIDING 360 STITCHING WORKFLOW AND PARAMETER

(71) Applicant: ELECTRONICS AND TELECOMMUNICATIONS RESEARCH INSTITUTE, Daejeon (KR)

(72) Inventors: Hee Kyung Lee, Daejeon (KR); Gi Mun Um, Seoul (KR); Jeong Il Seo, Daejeon (KR); Seong Yong Lim, Daejeon (KR); Joung Il Yun, Daejeon (KR); Won Sik Cheong, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 436 days.

(21) Appl. No.: 16/822,654

(22) Filed: Mar. 18, 2020

(65) Prior Publication Data
US 2020/0302575 A1    Sep. 24, 2020

(30) Foreign Application Priority Data

Mar. 19, 2019  (KR) ......................... 10-2019-0031415
Mar. 27, 2019  (KR) ......................... 10-2019-0035223
(Continued)

(51) Int. Cl.
*G06T 3/40*    (2006.01)
*G06F 9/38*    (2018.01)
(Continued)

(52) U.S. Cl.
CPC .......... *G06T 3/4038* (2013.01); *G06F 9/3836* (2013.01); *G06F 9/48* (2013.01); *G06T 19/006* (2013.01); *G06T 2210/52* (2013.01)

(58) Field of Classification Search
None
See application file for complete search history.

(56) References Cited

U.S. PATENT DOCUMENTS

2012/0106860 A1*  5/2012  Pan .......................... H04N 5/91
                                                           382/232
2015/0138309 A1    5/2015  Seok et al.
(Continued)

FOREIGN PATENT DOCUMENTS

KR    10-2016-0115466 A    10/2016
KR    10-2018-0010493 A    1/2018
KR    10-2018-0041784 A    4/2018

OTHER PUBLICATIONS

Park, Kyungmo et al., "Call for Proposals on Network-Based Media Processing", *International Organization for Standardization Organisation Internationale de Normalisation*, ISO/IEC JTC1/SC29/WG11 MPEG2018/N17503, San Diego, US, Apr. 2018 (pp. 1-11).
(Continued)

*Primary Examiner* — Yi Wang
(74) *Attorney, Agent, or Firm* — NSIP Law

(57) ABSTRACT

Disclosed herein is a method of creating an image stitching workflow including acquiring 360-degree virtual reality (VR) image parameters necessary to makes a request for image stitching and create the image stitching workflow, acquiring a list of functions applicable to the image stitching workflow, creating the image stitching workflow based on functions selected from the list of functions, determining the number of media processing entities necessary to perform tasks configuring the image stitching workflow and generating a plurality of media processing entities according to the determined number of media processing entities, and allocating the tasks configuring the image stitching workflow to the plurality of media processing entities.

12 Claims, 4 Drawing Sheets

(30) Foreign Application Priority Data

Jul. 4, 2019 (KR) ........................ 10-2019-0080820
Mar. 18, 2020 (KR) ........................ 10-2020-0033089

(51) Int. Cl.
*G06F 9/48* (2006.01)
*G06T 19/00* (2011.01)

(56) References Cited

U.S. PATENT DOCUMENTS

| 2017/0277556 A1* | 9/2017 | Ishii ................... G06F 9/45558 |
| 2019/0019062 A1* | 1/2019 | Fukui .................... G06V 20/56 |
| 2019/0087986 A1* | 3/2019 | Spohn .................. G06T 11/005 |
| 2019/0318453 A1 | 10/2019 | Jung et al. |

OTHER PUBLICATIONS

Park, Kyungmo et al., "Use cases and requirements for NBMP (v4)", *International Organization for Standardization Organisation Internationale de Normalisation*, ISO/IEC JTC1/SC29/WG11 MPEG2018/N17502, San Diego, US, Apr. 2018 (pp. 1-11).

\* cited by examiner

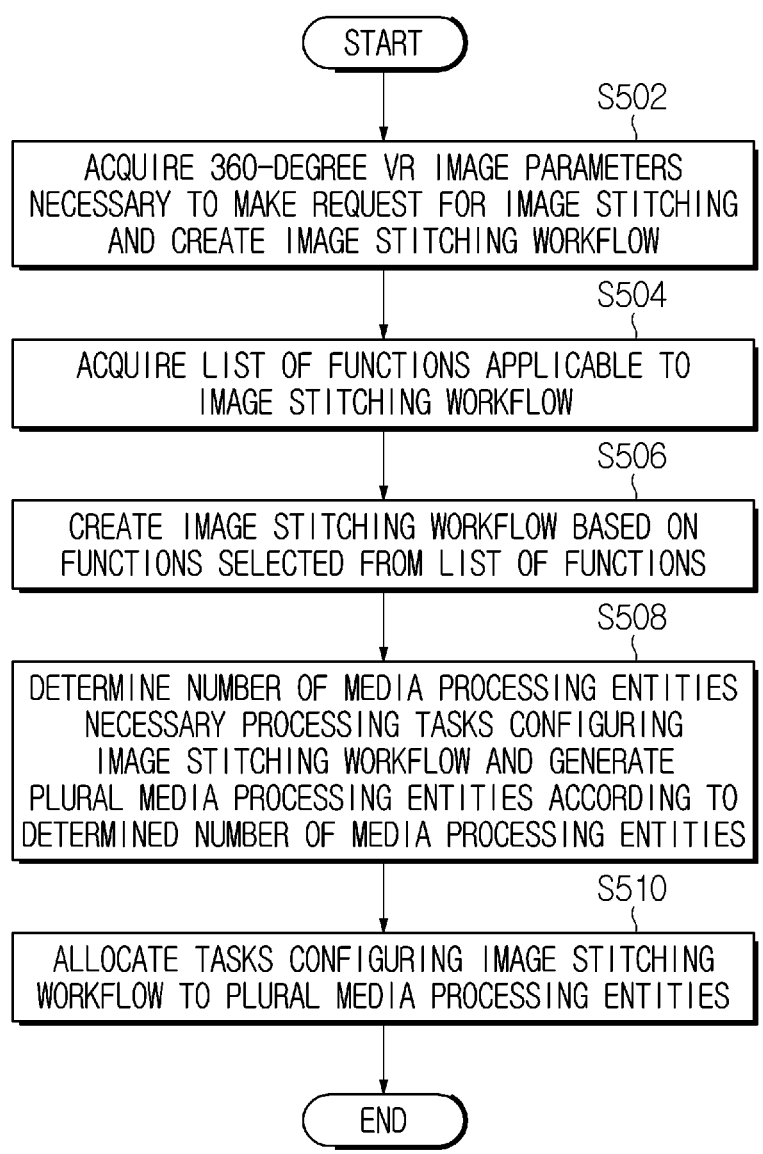

METHOD AND APPARATUS FOR PROVIDING 360 STITCHING WORKFLOW AND PARAMETER

CROSS REFERENCE TO RELATED APPLICATION

The present application claims priority to Korean Patent Application Nos. 10-2019-0031415 filed Mar. 19, 2019, 10-2019-0035223 filed Mar. 27, 2019, 10-2019-0080820 filed Jul. 4, 2019 and 10-2020-0033089 filed Mar. 18, 2020, the entire contents of which is incorporated herein for all purposes by this reference.

BACKGROUND OF THE INVENTION

1. Field of the Invention

The present disclosure relates to a high-definition 360-degree virtual reality (VR) image processing apparatus and method. More specifically, the present disclosure provides an apparatus and method for distributing tasks of a workflow into a plurality of media processing entities such that an image stitching workflow for a high-definition 360-degree VR broadcast service is performed by the plurality of media processing entities of a cloud platform. In addition, the present disclosure provides parameters regarding an image stitching workflow for a high-definition 360-degree VR broadcast service.

2. Description of the Related Art

The advent of digital broadcast has changed a traditional broadcast method of allowing users to view signals transmitted unilaterally from broadcast stations to a method of allowing users to selectively watching only desired content at desired times. In addition, development of broadband transmission technology can provide viewers with immersive broadcast services capable of high-definition immersive media (e.g., UHDTV, 3DTV, etc.) of 4K or more by overcoming bandwidth limitations.

The 360-degree virtual reality (VR) media allows viewers to select and view desired views by providing omnidirectional videos to the viewers. Recently, efforts to provide the 360-degree VR media through combination with broadcast networks are accelerating. In the case of the currently applied 360-degree VR media, it is possible to simultaneously provide full 4K or FHD VR media. In this case, although a desired view or region of interest (RoI) may be provided to a viewer without delay, the image quality of the view reproduced according to motion of the viewer may deteriorate. In addition, as another form, a 360-degree VR service streaming in a corresponding region based on information on a view selected by the viewer or motion of the viewer may provide a relatively-high-definition view. However, a motion to photon (MTP) for reproducing a high-definition image in response to motion of a user may lengthen.

Examples of 360-degree VR media related technology include technology for providing signaling indicating panoramic video broadcast service recognition and related video characteristics, technology for first transmitting thumbnail images and, at a receiver, transmitting requested data of a specific region based on the thumbnails, technology of classifying a panoramic video into tiles of certain regions and transmitting only data of a tile of a region selected by a user, etc. Such existing technologies have proposed signaling, tiling transmission and synchronization methods to provide a panoramic broadcast service. However, it is difficult to provide a 360-degree VR broadcast service based on motion or selection of a user in a broadcast network environment, for a high-quality 360-degreee VR image.

SUMMARY OF THE INVENTION

The present disclosure relates to a high-definition 360-degree virtual reality (VR) image processing apparatus and method. The present disclosure provides various types of parameters for creating an image stitching workflow. Since many computing resources are required for an image stitching process, a method and apparatus for allocating tasks required for image stitching to a plurality of media processing entities are proposed.

According to the present disclosure, provided is a method of creating an image stitching workflow including acquiring 360-degree virtual reality (VR) image parameters necessary to makes a request for image stitching and create the image stitching workflow, acquiring a list of functions applicable to the image stitching workflow, creating the image stitching workflow based on functions selected from the list of functions, determining the number of media processing entities necessary to perform tasks configuring the image stitching workflow and generating a plurality of media processing entities according to the determined number of media processing entities, and allocating the tasks configuring the image stitching workflow to the plurality of media processing entities.

According to an embodiment, the method may further include determining configuration information of a current task configuring the image stitching workflow and transmitting the configuration information of the current task to a task manager, and acquiring, from the task manager, access information of a next task performed immediately after the current task, when configuration of the current task is confirmed by the task manager.

According to an embodiment, the method may further include, when a content-dependent parameter changed according to content among the 360-degree VR parameters is changed, updating configuration information of a task related to the changed content-dependent parameter.

According to an embodiment, when the request for image stitching is stopped from a media source, the acquiring of the 360-degree VR image parameters to the allocating of the tasks configuring the image stitching workflow to the plurality of media processing entities may be stopped.

According to an embodiment, the tasks configuring the image stitching workflow may include decoding an encoded raw image, extracting a feature point of the decoded raw image, extracting a camera parameter based on the feature point, generating a 360-degree VR image, by projecting the decoded raw image onto a projection object based on the camera parameter, determining seam information of the 360-degree VR image based on the camera parameter, postprocessing the 360-degree VR image based on the seam information, and encoding the postprocessed 360-degree VR image.

According to an embodiment, the 360-degree VR image parameters may include at least one of a general descriptor parameter, an input descriptor parameter, an output descriptor parameter, a processing descriptor parameter, a requirement descriptor parameter, a client assistance descriptor parameter, a failover descriptor parameter, a monitoring descriptor parameter or a reporting descriptor parameter.

According to an embodiment, the 360-degree VR image parameters may include a configuration parameter, and the configuration parameter may include at least one of a media parameter, a feature parameter, a camera parameter, a projection parameter, a stitching parameter or a cloud parameter.

According to an embodiment, the media parameter may include at least one of a codec parameter, a chroma parameter, a frame per second (fps) parameter, a group of pictures (gop) parameter or a resolution parameter, the feature parameter may include at least one of a feature extraction method parameter, a feature point number parameter, a feature point position parameter or a selective feature correspondence parameter, the camera parameter may include at least one of a focal length parameter, a principal point parameter, a skew coefficient parameter, a translation parameter or a rotation parameter, the projection parameter may include a projection type parameter, the stitching parameter may include at least one of a seam position parameter or a seam mask parameter, and the cloud parameter may include at least one of a thresh number parameter or a graphic processing unit (GPU) number parameter.

According to an embodiment, the cloud parameter may indicate a computer resource necessary to perform the image stitching workflow, and the determining of the number of media processing entities necessary to process the tasks configuring the image stitching workflow and generating of the plurality of media processing entities according to the determined number of media processing entities may include determining the number of media processing entities according to the cloud parameter.

According to the present disclosure, provided is an image stitching workflow creation apparatus for creating an image stitching workflow, the image stitching workflow apparatus comprising one or more processors and one or more memory devices, wherein the one or more processors perform one or more instructions of a program for creating the image stitching workflow stored in the one or more memory devices, wherein the one or more memory devices stores the program for creating the image stitching workflow, and wherein the one or more instructions include acquiring 360-degree virtual reality (VR) image parameters necessary to make a request for image stitching and create the image stitching workflow, acquiring a list of functions applicable to the image stitching workflow, creating the image stitching workflow based on functions selected from the list of functions, determining the number of media processing entities necessary to perform tasks configuring the image stitching workflow and generating a plurality of media processing entities according to the determined number of media processing entities, and allocating the tasks configuring the image stitching workflow to the plurality of media processing entities.

According to an embodiment, the one or more instructions may include determining configuration information of a current task configuring the image stitching workflow and transmitting the configuration information of the current task to a task manager, and acquiring, the task manager, access information of a next task performed immediately after the current task from, when successful configuration of the current task is confirmed by the task manager.

According to an embodiment, the one or more instructions may include, when a content-dependent parameter changed according to content among the 360-degree VR parameters is changed, updating configuration information of a task related to the changed content-dependent parameter.

According to an embodiment, when the request for image stitching is stopped from a media source, the performing of the one or more instructions may be stopped.

According to the present disclosure, provided is a non-transitory computer-readable recording medium including a bitstream including 360-degree virtual reality (VR) image parameters necessary for image stitching of a 360-degree VR image, wherein the 360-degree VR image parameters include at least one of a general descriptor parameter, an input descriptor parameter, an output descriptor parameter, a processing descriptor parameter, a requirement descriptor parameter, a client assistance descriptor parameter, a failover descriptor parameter, a monitoring descriptor parameter or a reporting descriptor parameter

BRIEF DESCRIPTION OF THE DRAWINGS

The above and other objects, features and other advantages of the present invention will be more clearly understood from the following detailed description taken in conjunction with the accompanying drawings, in which:

FIG. 5 is a flowchart illustrating an image stitching workflow creation method according to an embodiment of the present disclosure.

DESCRIPTION OF THE PREFERRED EMBODIMENTS

Figure 1:
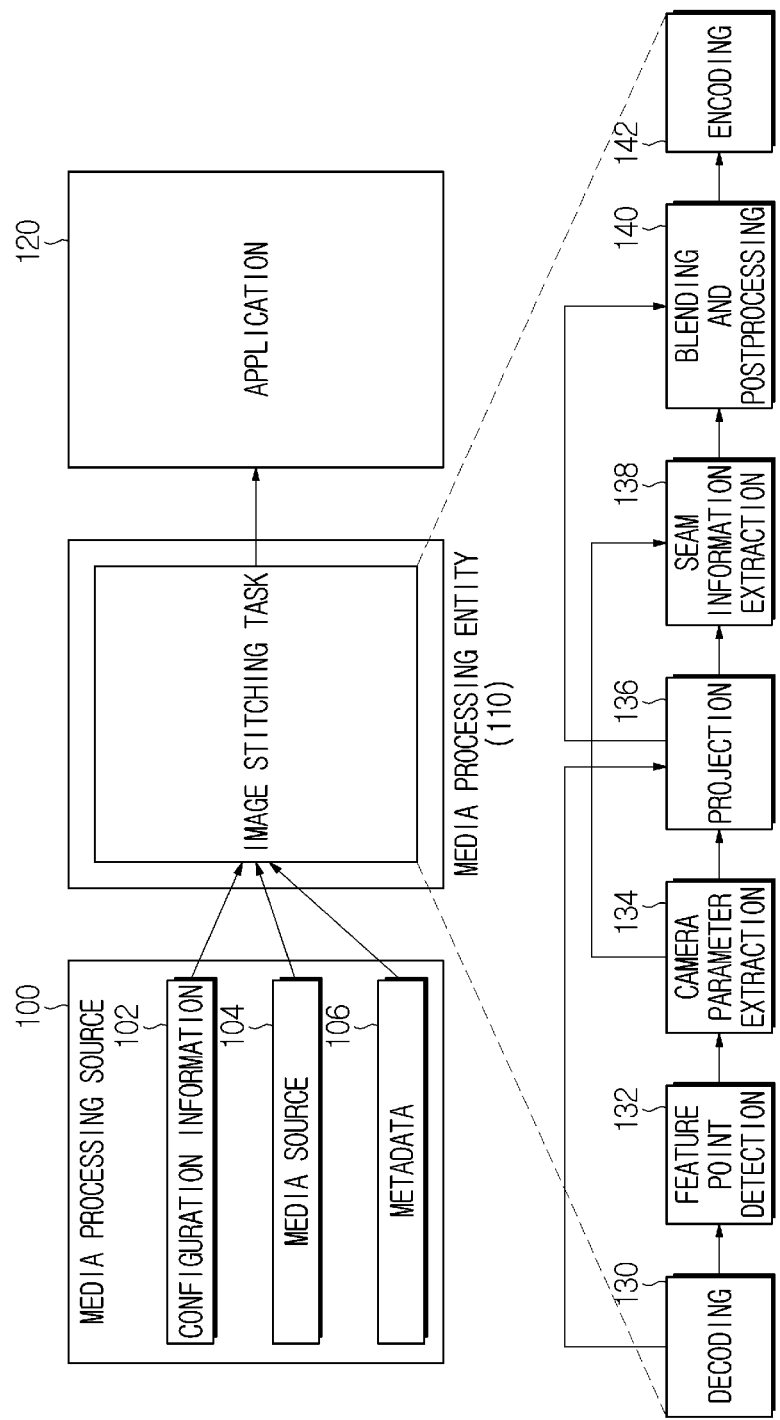
FIG. 1 is a view illustrating a method of processing a 360-degree VR image using a camera image and a camera depth image according to an embodiment of the present disclosure.

A variety of modifications may be made to the present invention and there are various embodiments of the present invention, examples of which will now be provided with reference to drawings and described in detail. However, the present invention is not limited thereto, although the exemplary embodiments can be construed as including all modifications, equivalents, or substitutes in a technical concept and a technical scope of the present invention. The similar reference numerals refer to the same or similar functions in various aspects. In the drawings, the shapes and dimensions of elements may be exaggerated for clarity. In the following detailed description of the present invention, references are made to the accompanying drawings that show, by way of illustration, specific embodiments in which the invention may be practiced. These embodiments are described in sufficient detail to enable those skilled in the art to implement the present disclosure. It should be understood that various embodiments of the present disclosure, although different, are not necessarily mutually exclusive. For example, specific features, structures, and characteristics described herein, in connection with one embodiment, may be implemented within other embodiments without departing from the spirit and scope of the present disclosure. In addition, it should be understood that the location or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to what the claims claim.

Terms used in the specification, 'first', 'second', etc. can be used to describe various components, but the components are not to be construed as being limited to the terms. The terms are only used to differentiate one component from other components. For example, the 'first' component may be named the 'second' component without departing from the scope of the present invention, and the 'second' component may also be similarly named the 'first' component. The term 'and/or' includes a combination of a plurality of items or any one of a plurality of terms.

It will be understood that when an element is simply referred to as being 'connected to' or 'coupled to' another element without being 'directly connected to' or 'directly coupled to' another element in the present description, it may be 'directly connected to' or 'directly coupled to' another element or be connected to or coupled to another element, having the other element intervening therebetween. In contrast, it should be understood that when an element is referred to as being "directly coupled" or "directly connected" to another element, there are no intervening elements present.

Furthermore, constitutional parts shown in the embodiments of the present invention are independently shown so as to represent characteristic functions different from each other. Thus, it does not mean that each constitutional part is constituted in a constitutional unit of separated hardware or software. In other words, each constitutional part includes each of enumerated constitutional parts for convenience. Thus, at least two constitutional parts of each constitutional part may be combined to form one constitutional part or one constitutional part may be divided into a plurality of constitutional parts to perform each function. The embodiment where each constitutional part is combined and the embodiment where one constitutional part is divided are also included in the scope of the present invention, if not departing from the essence of the present invention.

The terms used in the present specification are merely used to describe particular embodiments, and are not intended to limit the present invention. An expression used in the singular encompasses the expression of the plural, unless it has a clearly different meaning in the context. In the present specification, it is to be understood that terms such as "including", "having", etc. are intended to indicate the existence of the features, numbers, steps, actions, elements, parts, or combinations thereof disclosed in the specification, and are not intended to preclude the possibility that one or more other features, numbers, steps, actions, elements, parts, or combinations thereof may exist or may be added. In other words, when a specific element is referred to as being "included", elements other than the corresponding element are not excluded, but additional elements may be included in embodiments of the present invention or the scope of the present invention.

In addition, some of constituents may not be indispensable constituents performing essential functions of the present invention but be selective constituents improving only performance thereof. The present invention may be implemented by including only the indispensable constitutional parts for implementing the essence of the present invention except the constituents used in improving performance. The structure including only the indispensable constituents except the selective constituents used in improving only performance is also included in the scope of the present invention.

Hereinafter, embodiments of the present invention will be described in detail with reference to the accompanying drawings. In describing exemplary embodiments of the present specification, well-known functions or constructions will not be described in detail since they may unnecessarily obscure the understanding of the present invention. The same constituent elements in the drawings are denoted by the same reference numerals, and a repeated description of the same elements will be omitted.

In the present disclosure, various embodiments of a stitching method of generating a 360-degree VR image will be described. In the present disclosure, various embodiments of a method of implementing the stitching method in a cloud environment will be described.

FIG. 1 is a view illustrating a method of processing a 360-degree VR image according to an embodiment of the present disclosure.

A media processing source 100 includes configuration information 102, a media source 104 and metadata 106. The configuration information 102 and the media data 106 indicate information related to a plurality of input video streams. The media source 104 includes raw images which are materials of the 360-degree VR image. In one embodiment, the media source 104 may include a texture image and a depth image. Alternatively, in one embodiment, the media source 104 may include only a texture image. The configuration information 102, the media source 104 and the media data 106 of the media processing source 100 are transmitted to a media processing entity 110.

The media processing entity 110 stitches the images of the media source 104 according to the configuration information 102 and the media data 106. FIG. 1 shows detailed steps necessary for image stitching. A 360-degree VR image is generated according to the image stitching of FIG. 1. In addition, the 360-degree VR image may be transmitted to an application 120 for processing the 360-degree VR image.

Figure 2:
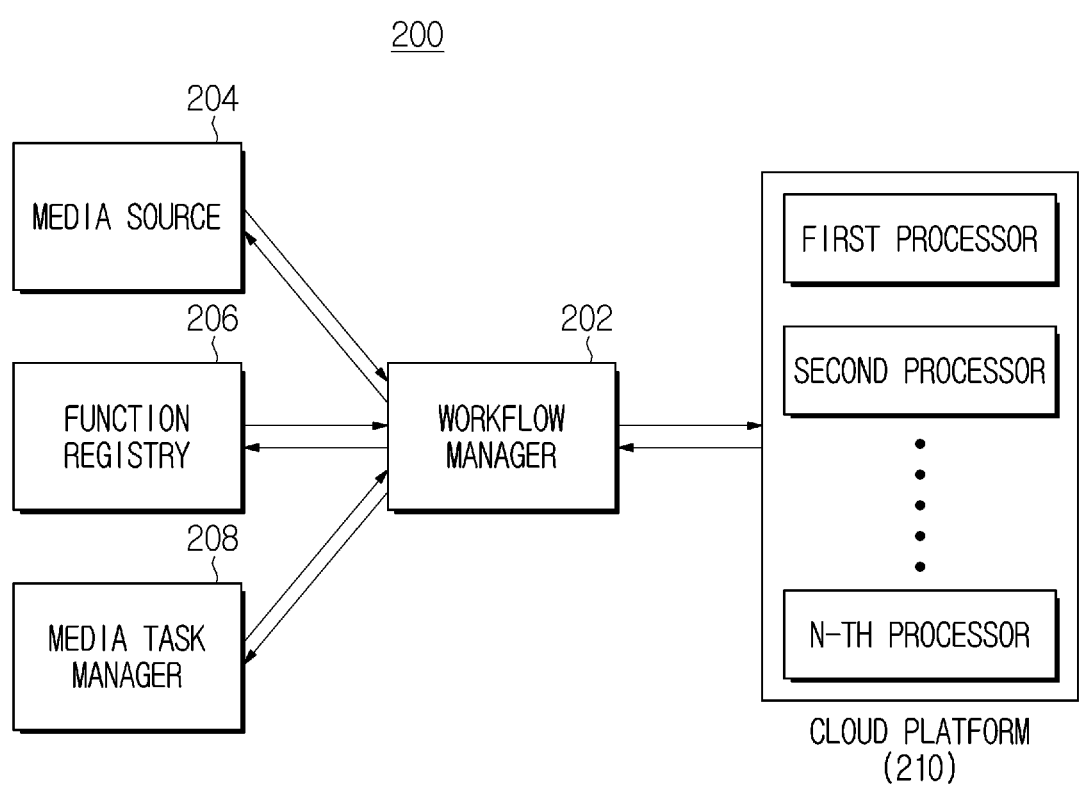
FIG. 2 is a view showing a media system for image stitching according to a plurality of processing entities according to an embodiment of the present disclosure.

The media processing entity 110 is set by a workflow manager 202 of FIG. 2. Upon determining that the image stitching workflow cannot be processed by a single processing entity, two or more media processing entities 110 may be set. Upon determining that the image stitching workflow can be processed by a single processing entity, only one media processing entity 110 may be set. The media processing entity 110 may be generated by the workflow manager 202 of FIG. 2 in a cloud platform 210 of FIG. 2.

If two or more the media processing entities 110 are set, tasks according to steps 130 to 142 of FIG. 1 may be allocated to a plurality of media processing entities 110. Accordingly, an image stitching tasks requiring many computing resources may be rapidly processed by the plurality of media processing entities 110.

When an image stitching task is processed by the plurality of media processing entities 110, for example, configuration information regarding detailed tasks such as image decoding, feature point extraction, camera parameter extraction, image projection, seam information extraction, blending, postprocessing and image encoding related to image stitching, input and output descriptors and metadata are required to allocate the tasks. The above information is used to process an interface between several tasks in a plurality of processing entities. To this end, details such as media, functions, camera, projection, stitching and cloud parameters to be used for each task of the image stitching process is applied to detailed steps of image stitching. Hereinafter, detailed steps (steps 130 to 142) of image stitching will be described in detail.

In step 130, an encoded image is decoded. Specifically, in step 130, the encoded raw image of the media source 104 is decoded according to operation of several threads or GPUs. In addition, a media data feed encoded from a cloud parameter as well as the media source 104 may be used for decoding in step 130. The raw image indicates an original image, to which postprocessing is not applied.

In step 132, feature points are extracted from the raw image decoded in step 130. The feature point means a point which is a criterion for matching between an image and an image when a specific object is tracked or recognized in a plurality of images. By analyzing the values of pixels distributed based on the feature point, similar parts between different images are detected. Accordingly, by comparing the feature points between neighboring raw images in step 132, a corresponding point between neighboring raw images may be determined. In addition, a stitching process may be performed between neighboring raw images according to the corresponding point.

In step 134, extrinsic and intrinsic parameters are calculated according to the feature points and the correspondence sets. The extrinsic camera parameters include a shooting angle, shooting position, etc. of a camera. The intrinsic camera parameters include a focal length, principal point, skew coefficient, etc. of the camera.

According to an embodiment, by analyzing the feature points and the corresponding points, differences in shooting angle and shooting position between two cameras used to capture two neighboring images may be calculated. Accordingly, the extrinsic parameters of the camera may be determined according to the feature points and the corresponding points.

According to an embodiment, by analyzing the feature points and the corresponding points, differences in focal length, principal point and skew coefficient between the two cameras may be calculated. Accordingly, the intrinsic parameters of the camera may be determined according to the feature points and the corresponding points.

In addition, in step 134, an image distortion correction process based on the camera parameters may be selectively performed. According to an embodiment, the image distortion correction process may correct image distortion according to lens characteristics.

In step 136, the raw images decoded in step 130 is projected on sphere, cube, polyhedron and equirectangular (ERP) projection based on the camera parameters determined in step 134. Specifically, images are geometrically aligned based on the camera parameters and image projection surfaces. In addition, the geometrically aligned images are projected onto image projection surfaces. As the result of image projection, a 360-degree VR image is generated.

In step 138, stitching parameters for the seams of the neighboring images are extracted from the 360-degree VR image generated in step 136. The stitching parameters may include a seam position parameter for the position of the seam or a seam mask parameter indicating a region corresponding to the seam in the image. The stitching parameters for the seams may be determined based on the camera parameters determined in step 134.

In step 138, when an object which is not present at a previous point of time suddenly appears in an overlapped region of the neighboring images, the stitching parameters may be updated. Accordingly, the seam position parameter or the seam mask parameter may be changed according to change in overlapped region.

In step 140, blending, color correction and noise filtering processes may be performed with respect to the overlapped region of the 360-degree VR image generated in step 136. The blending, color correction and noise filtering processes may be performed based on the seam information extracted in step 138.

The blending process refers to a process of mixing two partial images corresponding to the overlapped operation of the 360-degree VR image such that the 360-degree VR image is visually recognized as one continuous image. The color correction process means a process of controlling color parameters such as color, brightness and chroma such that the images configuring the 360-degree VR image are recognized as one image. The noise filtering process means a process of removing noise of an image. According to the process of step 140, the 360-degree VR image generated from a plurality of images is visually recognized as one image.

In step 142, the 360-degree VR image processed in step 140 is decoded. Coding in step 142 may be performed according to cloud parameters. In addition, the encoded 360-degree VR image may be output by the cloud platform.

Through steps 130 to 142, a video stream composed of encoded 360-degree VR images is generated from a video stream composed of encoded two-dimensional images. In some embodiments, the order of steps 130 to 142 may be partially changed and predetermined steps may be omitted. In addition, in the middle of steps 130 to 142, a conventional image processing scheme of an image processing field is applicable. Instructions corresponding to steps 130 to 142 may be performed in the cloud platform 210 of FIG. 2. Hereinafter, in Table 1, description, input and output of the tasks of steps 130 to 142 will be described.

TABLE 1

| Task | Description | Input | Output |
| --- | --- | --- | --- |
| Decoding | Involves video type conversion from encoded video stream feed from media source to raw video stream using several threads or GPUs. | Encoded media data feed from media source, and media and cloud parameters | Decoded media data like raw images |
| Feature point extraction | Involves feature point extraction and matching corresponding points process between neighboring raw images. | Raw images to be aligned(stitched), and feature extraction method | Extracted feature points and correspondence sets |
| Camera parameter extraction | Involves camera extrinsic and intrinsic parameter calculation using feature points and correspondence sets. Optionally, involves image distortion correction process using camera parameters. | Extracted feature points and correspondence sets | Extrinsic/intrinsic camera parameters and Lens distortion corrected images |

TABLE 1-continued

| Task | Description | Input | Output |
| --- | --- | --- | --- |
| Projection | Involves image projection on the sphere, cube, polyhedron, and ERP with geometric alignment based on the camera parameters. | Lens distortion corrected images and projection and camera parameters | Projected 360 images |
| Seam information extraction | Involves seam extraction or update process required when suddenly an object appears on the overlapped region. | Projected 360 images and initially extracted stitching parameters including seam position or seam mask | Extracted or updated stitching parameters including seam position or seam mask |
| Blending and post-processing | Involves blending, color correction, and noise filtering in the overlapped region of projected 360 images | Projected 360 images, and stitching parameters | Blended and post-processed 360 images |
| Encoding | Involves video encoding of blended and post-processed 360 images using several threads or GPUs. . | Blended and post-processed 360 images and media and cloud parameters | Encoded 360 video *It could be the output of cloud platform |

A media service provider may provide an image stitching service to a user using the workflow of steps 130 to 142. The task directory of the media service provider may include details of the tasks of Table 1. In addition, the workflow manager 202 of FIG. 2 may prepare the workflow illustrated in FIG. 1, by selecting each task of Table 1. Hereinafter, the media system 200 for distributing the image stitching process according to steps 130 to 142 described in FIG. 1 into the plurality of media processing entities 110 will be described.

FIG. 2 is a view showing a media system 200 for image stitching according to a plurality of processing entities according to an embodiment of the present disclosure.

The media system 200 includes a workflow manager 202, a media source 204, a function registry 206, a media task manager 208 and a cloud platform 210. The media system 200 of FIG. 2 are shown as including some components necessary to describe the present embodiment and the components included in the media system 200 of the present disclosure are not limited to the above-described example. For example, two or more components may be implemented in one component or operations performed in one component may be implemented to be performed in two or more components. In addition, some component may be omitted or additional components may be added.

The workflow manager 202, the media source 204, the function registry 206 and the media task manager 208 may operate by separate processors. Alternatively, some or all of the workflow manager 202, the media source 204, the function registry 206 and the media task manager 208 may operate by one processor. In addition, the workflow manager 202, the media source 204, the function registry 206 and the media task manager 208 may include memory devices for storing information for image stitching, respectively.

The workflow manager 202 may create a workflow for image stitching. In addition, the workflow manager 202 may generate a plurality of media processing entities for performing a plurality of tasks included in the workflow, in the cloud platform 210.

The cloud platform 210 includes a plurality of processors. In addition, tasks necessary for image stitching may be performed by the plurality of media processing entities set in the cloud platform 210. Hereinafter, a workflow configuration method of image stitching by the workflow manager 202 will be described in detail with reference to FIG. 3.

Figure 3:
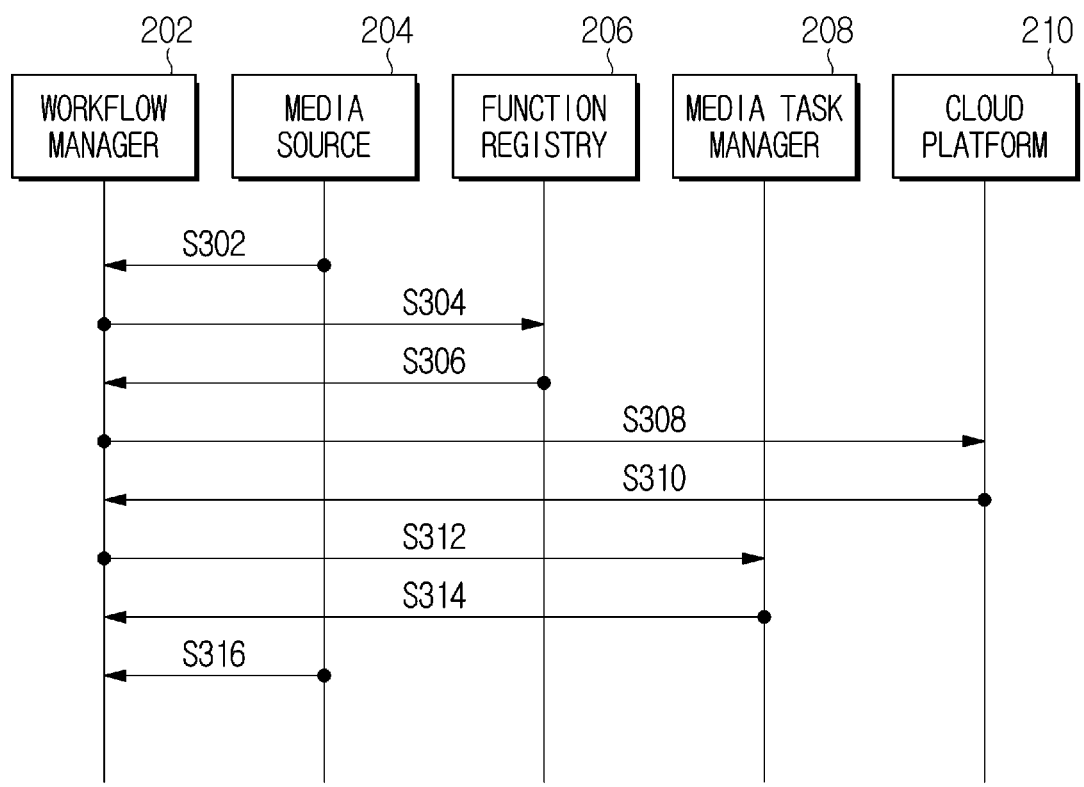
FIG. 3 is a view illustrating a workflow for performing tasks of image stitching according to an embodiment of the present disclosure.

FIG. 3 is a view illustrating a workflow for performing a task of image stitching according to an embodiment of the present disclosure.

In step S302, the media source 204 creates a workflow for image stitching along with a request for image stitching, using a CreateWorkflow API (Application Programming Interface). The CreateWorkflow API is a dedicated API for creating a workflow. In addition, the media source 204 generates a workflow description document describing the created workflow and transmits the workflow description document to the workflow manager 202. The workflow manager 202 creates the workflow according to the transmitted workflow description document.

The workflow description document may include a general descriptor parameter, an input descriptor parameter, an output descriptor parameter, a processing descriptor parameter, a requirement descriptor parameter, a client assistance descriptor parameter, a failover descriptor parameter, a monitoring descriptor parameter and a reporting descriptor parameter.

The general parameter includes an ID, a name, a description, a brand, priority, etc. of the workflow. The input descriptor parameter includes media parameters such as a codec type of an image to be input, a frame rate, resolution, the number of input views, a metadata stream and a metadata collection format. The output descriptor parameter includes media parameters such as a codec type, a frame rate, a publish format, a metadata stream, and a metadata collection format of a stitching image to be output by the workflow. The processing descriptor parameter includes parameters for processing types of the tasks of image stitching and linking information between the tasks. The requirement descriptor parameter includes parameters for requirements of the complete workflow, such as delay requirements. The client assistance descriptor parameter includes parameters for assistance of clients of the workflow. The failover descriptor parameter includes parameters for system failover of the workflow. The monitoring descriptor parameter includes parameters for the monitoring type of the workflow. The reporting descriptor parameter includes a parameter indicating a type, an interval, a start time for reporting the result of monitoring the workflow.

Hereinafter, Table 2 shows an embodiment of the descriptor parameters of the workflow description document and sub parameters included in the descriptor parameters.

TABLE 2

| No | Parameter | Additional Description |
|---|---|---|
| 1 | General Descriptor | Provides details about the required workflow. Following are the list of parameters: ID: m-360VR stitching Name: m-360VR stitching Description: 360VR stitching workflow with multiple processing entities Brand: urn:mpeg:nbmp:2019:functions:m-360VRStitcher Priority: 2 |
| 2 | InputDescriptor | Provides information describing input that the media source intends to use for this workflow. Media Parameters: N-number of media descriptions (N: total number of media sources). Each media description has following parameters Media Stream Id: MediaStreamId of media stream Codec type: HEVC Media Type: Video Codec clock rate: 60 fps Protocol: MMT Origination: URL of the Media stream Metadata Parameters: Metadata Stream Id: MetadataStreamId of metadata description of interested view stream MetadataDictionary: MORE Protocol: <ingest-protocol> MetadataIngestFormat: JSON Origination: URL of the Metadata stream |
| 3 | OutputDescriptor | Provides information describing output that the media source intends to use for this workflow. Media Parameters: Stream Information Media Stream Id: MediaStreamId of output media stream Stream Tag: stream-tag Bandwidth: Bandwidth Codec type: AVC, HEVC, VVC Media Type: Video Clock rate: 60 fps Protocol: <protocol> Destination: <destination-location> Publish Format: OMAF Metadata Parameters: Metadata Stream Id: n/a MetadataDictionary: MPEG-I Metadata Protocol: n/a MetadataIngestFormat: JSON Origination: URL of the Metadata stream |
| 4 | ProcessingDescriptor | Provides details about the type of processing the media source intends to set up. Keyword Search for Tasks: 360VR stitching, multiple processing entities TaskConnectionMap: Linking information between different tasks in the static workflow <OutputTask.OutputPort, InputTask.InputPort> Decoding[0 . . . n].outputFrame, FeaturepointExtraction[0 . . . n].inputFrame FeaturepointExtraction[0 . . . n].outputFeatureArray, CameraParameterExtraction.inputFeatureArray CameraParameterExtraction.outputCameraParameters, Projection.inputCameraParameters Decoding[0 . . . n].outputFrame, Projection[0 . . . n].inputFrame CameraParameterExtraction.outputCameraParameters, SeamInformationExtraction.inputCameraParameters Projection[0 . . . n].outputFrame, SeamInformationExtraction.inputFrame SeamInformationExtraction.outputSeamMasks, BlendingandPostProcessing.inputSeamMasks Projection[0 . . . n].outputFrame, BlendingandPostProcessing.inputFrame BlendingandPostProcessing.outputFrame, Encoding.inputFrame |
| 5 | RequirementDescriptor | Specifies requirement information for the complete workflow. Such information includes: QoS requirements: Detailed QoS requirements for the end-to-end workflow |

TABLE 2-continued

| No | Parameter | Additional Description |
|---|---|---|
| | | delay requirements: Real-time |
| | | Processing requirements: |
| | | Hardware-requirements: |
| | | GPU: 4 |
| | | CPU Cores: 8 |
| | | Deployment-requirements: |
| | | Location: <network-edge> |
| | | Security requirements: No need |
| 6 | ClientAssistance | Provides client assistance information for the workflow. |
| | | Device-capabilities: n/a |
| | | User-preferences: n/a |
| 7 | FailoverDescriptor | Provides information in case of failover of this workflow. |
| | | FailoverMode: |
| | | ExecuteBackupDeployment |
| | | FailoverDelay: 0 |
| | | State Persistence Descriptor: |
| | | BackupDeployment: |
| 8 | MonitoringDescriptor | Provides information for type of monitoring for this workflow. Such information includes: |
| | | Event: CRITICAL event |
| | | Variable: No need |
| | | System: No need |
| 9 | ReportingDescriptor | Report-type: <Consumption, QoS> |
| | | Reporting-Interval: 120 |
| | | Reporting-start-time: <start-time> |
| | | URL: <reporting-server-URL> |

In step 304, the workflow manager 202 transmits a query or a query set to the function registry 206, in order to find a function to be placed in the workflow for image stitching. The query or the query set describes the function of the workflow requested by the workflow description document of step 302. In addition, the function registry 206 stores a list of functions supported by the media system 200.

In step 306, for each query, the function registry 206 provides functions to be used for image stitching and a list of description and configuration information thereof to the workflow manager 202. The function registry 206 compares the list of the functions supported by the media system 200 with the description of the functions of the workflow described in the query or the query set. In addition, the function registry 206 may provide the workflow manager 202 with the list of the functions applicable to the workflow among the functions supported by the media system 200.

In step 308, the workflow manager 202 selects functions necessary for the workflow from the list of the functions provided by the function registry 206 in step 306. In addition, the workflow manager 202 may access the cloud platform 210 and generate one or more media processing entities in the cloud platform 210 according to the requirements of the selected functions.

In step 310, the cloud platform 210 confirms generation of one or more media processing entities. In addition, the cloud platform 210 may confirm generation of network access information for the one or more media processing entities. The cloud platform 210 transmits generation of the one or more media processing entities to the workflow manager 202.

In step 312, the workflow manager 202 generates configuration information of each task. In addition, the workflow manager 202 transmits the configuration information to the task manager 208 for each task. In order to transmit the configuration information to the task manager 208, a task API may be used. The task API is a dedicate API for generating the configuration information.

In step 314, the task manager 208 determines whether each task is successfully configured. If a current task is successfully configured, the task manager 208 generates access information such that the workflow manager 202 accesses a next task. In addition, the task manager 208 generates access information to the workflow manager 202. By performing step 312 and step 314 for each task, it is possible to determine whether the complete workflow is successfully configured.

In step 316, the workflow manager 202 confirms creation of the workflow and notify the media source 204 that media processing for image stitching may start. In addition, the media source 104 provided by the media source 204 may be processed according to the workflow, thereby generating the 360-degree VR image.

According to one embodiment, the workflow manager 202 may continuously monitor content-dependent parameters related to the output of each task. The content-dependent parameters mean parameters changed according to content. When some content-dependent parameters of each task needs to be changed for a next segment of video, the workflow manager 202 may update the configuration information using the task API. In addition, the workflow manager 202 may transmit the updated configuration information to the corresponding task.

According to one embodiment, when there is no request for image stitching (or the request is stopped), the media source 204 may stop image stitching using a DeleteWorkflow API.

In FIGS. 2 and 3, creation of the stitching workflow and the process of the switching workflow are performed by interaction between the plurality of entities in steps 302 to 316. However, according to one embodiment, unlike FIGS. 2 and 3, all the functions of the workflow manager 202, the media source 204, the function registry 206 and the media task manager 208 may be performed in the cloud platform 210. Accordingly, according to one embodiment, all tasks necessary to create the workflow for stitching may be performed in the cloud platform 210.

As described above, many parameters for the tasks of the workflow are necessary to configure the functions used in the workflow, generate an appropriate number of media processing entities for performing the tasks of the workflow, and determining the configuration information of each task of the workflow.

Hereinafter, Table 3 shows an embodiment of a parameter list of an image stitching function reference template. In Table 3, types and descriptions of the parameters of the workflow will be described in greater detail.

TABLE 3

| Descriptor | Parameter Name | Type | Description |
|---|---|---|---|
| General | ID | String | Provided by the Function Repository |
| | Name | String | "m-360VRStitcher" |
| | Description | String | "360 VR stitcher with multiple processing entities" |
| | Brand | String | "urn:mpeg:nbmp:2019:functions:m-360VRStitcher" |
| | InputPorts | Map | Collection of named input media streams (1 . . . n inputs), and metadata "media": media input "metadata": metadata input |
| | OutputPorts | Map | Contains at least one media and one optional metadata "media": media output "metadata": metadata output |
| Input | Media Parameters | Object | (Encoded) images or videos to be stitched Provides input media capabilities of this m-360VRstitcher Stream Schema: CMAF, OMAF, ISOBMFF Media Stream Id: n/a Codec type: AVC, HEVC, VVC Media Type: Video, Image Codec clock rate: 24 fps, 25 fps, 30 fps, 50 fps, 60 fps Protocol: n/a Origination: n/a |
| | Metadata Parameters | Object | Provides input metadata capabilities of this m-360VRstitcher Metadata Schema: MORE, MPEG-V[W사]-1] Metadata Stream Id: n/a MetadataDictionary: MORE, MPEG-V Protocol: n/a MetadataIngestFormat: JSON, ISOBMFF, XML Origination: URL of the Metadata stream |
| Output | Media Parameters | Object | Provides output media capabilities of this m-360VRstitcher Stream Schema: OMAF Media Stream Id: n/a Codec type: AVC, HEVC, VVC Media Type: Video, Image Codec clock rate: 24 fps, 25 fps, 30 fps, 50 fps, 60 fps Protocol: MPEG-DASH, MPEG-MMT, MPEG2-TS Origination: n/a |
| | Metadata Parameters | Object | Provides output metadata capabilities of this m-360VRstitcher Metadata Schema: MPEG-I Metadata, MORE Metadata Stream Id: n/a MetadataDictionary: MPEG-I Metadata, MORE Protocol: n/a MetadataIngestFormat: JSON, ISOBMFF, XML Origination: URL of the Metadata stream |
| Processing | Keywords | Array | Number of keywords "m-360vrstitching" "m-360 stitching" |
| | TaskConnectionMap | | Linking information between different tasks in the static workflow <OutputTask.OutputPort, InputTask.InputPort> Decoding[0 . . . n].outputFrame, FeaturepointExtraction[0 . . . n].inputFrame FeaturepointExtraction[0 . . . n].outputFeatureArray, CameraParameterExtraction.inputFeatureArray CameraParameterExtraction.outputCameraParameters, Projection.inputCameraParameters Decoding[0 . . . n].outputFrame, Projection[0 . . . n].inputFrame CameraParameterExtraction.outputCameraParameters, SeamInformationExtraction.inputCameraParameters Projection[0 . . . n].outputFrame, SeamInformationExtraction.inputFrame SeamInformationExtraction.outputSeamMasks, BlendingandPostProcessing.inputSeamMasks |

TABLE 3-continued

| Descriptor | Parameter Name | Type | Description |
|---|---|---|---|
| | | | Projection[0 . . . n].outputFrame, BlendingandPostProcessing.inputFrame BlendingandPostProcessing.outputFrame, Encoding.inputFrame |
| Requirements | QoS Requirements | Object | All input videos must be synchronized based on MORE |
| | Processing Requirements | Object | Processing requirements: Hardware-requirements: GPU: 4 CPU Cores: 8 Deployment-requirements: Location: <network-edge> |
| | Security Requirements | Object | n/a |
| Configuration | Parameters | Array | Function parameters Media parameters (codec, chroma, fps, gop, resolution) Feature parameters (feature extraction method, # of feature points, feature point position, optional feature correspondence) Camera parameters (intrinsic & extrinsic parameters: focal length, principal point, and skew coefficient, translation and rotation from camera calibration result) Projection parameters (projection type) Stitching parameters (seam positions and seam masks) Cloud parameters (# of threads, # of GPUs to be used) |
| ClientAssistance | clientAssistanceFlag | Boolean | |
| | Device Capabilities | String | |
| | User Preferences | String | |
| Monitoring | Variable | Array | |
| Assertion | Assertions | Object | |

The TaskConnectionMap parameter of the processing descriptor parameter of Table 3 above includes linking information between the tasks of the workflow of image stitching described in steps 130 to 142. According to the description of TaskConnectionMap, the linking information is provided in the form of "<OutputTask.OutputPort,InputTask.InputPort>". OutputTask indicates an output task and InputTask indicates an input task. In addition, OutputPort indicates the form of output information according to the output task, and InputPort indicates the form of input information for the input task.

For example, "Decoding[0 . . . n].outputFrame, FeaturepointExtraction[0 . . . n].inputFrame" output task is decoding and indicates that an output frame is generated according to end of the decoding task. In addition, the above syntax indicates feature point extraction and indicates that an input frame is input for a feature point extraction task. In addition, according to the above syntax, it can be seen that the output information of the decoding task is input to the feature point extraction task.

When the image stitching workflow is implemented according to the linking information of TaskConnectionMap of Table 3, it can be seen that the detailed steps of image stitching are implemented similarly to steps 130 to 142 of FIG. 1.

Configuration parameters are defined in Table 3. The configuration parameters include sub parameters for configuration information of tasks necessary for the image stitching workflow. For example, the media parameter may be represented by data in the form of an array including sub parameters regarding codec, chroma, fps (frame per second), gop (group of pictures) and resolution. The feature parameter may be represented by data in the form of an array including sub parameters regarding a feature extraction method, a feature point number, a feature point position, a selective feature correspondence. The camera parameter may be represented by data in the form of an array including sub parameters regarding a focal length, a principal point, a skew coefficient and camera translation and rotation. The projection parameter may be represented by data in the form of an array including sub parameters regarding a projection type. The stitching parameter may be represented by data in the form of an array including sub parameters regarding a seam position and a seam mask. The cloud parameter may be represented by data in the form of an array including sub parameters regarding the number of threads, the number of GPUs, etc.

Hereinafter, embodiments of the parameters necessary for image stitching tasks will be described in Tables 4 to 9.

Table 4 shows an embodiment of the media parameter.

TABLE 4

| Parameter name | Type | Parameter description |
|---|---|---|
| Codec | String | Codec type of video h.264/avc, h.265/hevc, etc. Compression type of image png, jpg etc. |
| Chroma | String | Chroma subsampling type yuv420, yuv422, yuv444 etc. |
| Fps | Number | Frame per second, 30, 60 etc. |
| Cop | Number | GOP size (length between two I frames), 15, 30 etc. |
| Resolution | String | Resolution 3840 × 2160, 7680 × 4320 etc. |

Table 5 shows an embodiment of the feature parameter.

TABLE 5

| Parameter name | Type | Parameter description |
| --- | --- | --- |
| Feature extraction method | String | Feature extraction method SIFT, SURF, KAZE, AKAZE, ORB, BRISK, BRIEF, LoG etc. |
| Feature point number | Number | Number of feature points |
| Feature point positions | Array | Feature point locations can be identified by x, y coordinates. |
| Feature correspondence | String | Corresponding points for each feature point |

Table 6 shows an embodiment of the camera parameter.

TABLE 6

| Parameter name | Type | Parameter description |
| --- | --- | --- |
| Camera_shutter_type | String | "rolling" or "global" |
| Camera_sync_skew | Number | 0 if in synch, milliseconds for out of synch, −1 if not known |
| Capturing_settings | Object | Scene type (indoor or outdoor), ambient light, exposure etc. |
| Camera_extrinsics | Object | Camera transformation parameters (translation and rotation for global to camera transformation) used to align images in 3D space |
| Camera_intrinsics | Object | Camera intrinsic parameters (focal length, principal point, and skew coefficient) used to align images in 3D space |

Table 7 shows an embodiment of the projection parameter.

TABLE 7

| Parameter name | Type | Parameter description |
| --- | --- | --- |
| Projection_type | String | Projection type, equirectangular, cubic, spherical cylindrical etc. |

Table 8 shows an embodiment of the stitching parameter.

TABLE 8

| Parameter name | Type | Parameter description |
| --- | --- | --- |
| Seam_positions | Array | Interpolated area in effecting the final stitching quality. The region structure can be represented by series of pixel points (start point, intersection points, end point) |
| Seam_mask | Object | Optionally, interpolated area locations can be represented by mask image, which has only 1 or 0 value, for more sophisticated stitching process. Mask images can be also positioned by URL or URI |
| Preserved_regions | Array | Provides region of important when processing multiple media as one of the types as below - Input media stream id RectangleType{left, right, top, , bottom} RegionMask{Mask_image} DepthMask{Mask_Grey_image} MultipathType(Array of 2D Points) |
| Stitching_method | String | Specific stitching algorithm can be specified for partial or full stitching approaches. |

TABLE 8-continued

| Parameter name | Type | Parameter description |
| --- | --- | --- |
| Seam_extent_of_freedom | Number | The degree of freedom the seam region can be moved, e.g. horizontally |

Figure 4:
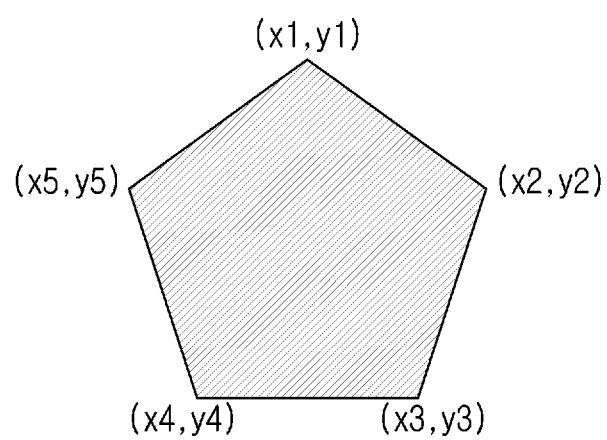
FIG. 4 is a view illustrating a method of determining a preserved region according to a multi-path type.

FIG. 4 is a view illustrating a method of determining a preserved region according to a multi-path type. In FIG. 4, the preserved region may be determined according to five points of (x1, y1) to (x5, y5). In some embodiment, the number of points for determining the preserved region may be differently set.

Table 9 shows an embodiment of the cloud parameter.

TABLE 9

| Parameter name | Type | Parameter description |
| --- | --- | --- |
| Thread number | Number | Number of thread to be used |
| GPU number | Number | Number of GPU to be used |

Each task of image stitching may be configured according to the parameters of the embodiments described in Tables 4 to 9.

FIG. 5 is a flowchart illustrating an image stitching workflow creation method according to an embodiment of the present disclosure.

In step 502, 360-degree VR image parameters necessary to make a request for image stitching and create an image stitching workflow are acquired.

In step 504, a list of functions applicable to the image stitching workflow is acquired.

In step 506, the image stitching workflow is created based on functions selected from the list of functions.

In step 508, the number of media processing entities necessary to perform tasks configuring the image stitching workflow is determined, and a plurality of media processing entities is generated according to the determined number of media processing entities.

In step 510, the tasks configuring the image stitching workflow are allocated to the plurality of media processing entities.

The image stitching workflow creation method may further include determining configuration information of a current task configuring the image stitching workflow and transmitting the configuration information of the current task to a task manager, and acquiring, from the task manager, access information of a next task performed immediately after the current task, when configuration of the current task is confirmed by the task manager.

The image stitching workflow creation method may further include, when a content-dependent parameter changed according to content among the 360-degree VR parameters is changed, updating configuration information of a task related to the changed content-dependent parameter.

In the image stitching workflow creation method, when the request for image stitching is stopped from a media source, the steps of FIG. 5 may be configured to be stopped.

The tasks configuring the image stitching workflow may include decoding an encoded raw image, extracting a feature point of the decoded raw image, extracting a camera parameter based on the feature point, generating a 360-degree VR image, by projecting the decoded raw image onto a projection object based on the camera parameter, determining seam information of the 360-degree VR image based on the camera parameter, postprocessing the 360-degree VR image based on the seam information, and encoding the postprocessed 360-degree VR image.

The 360-degree VR image parameters may include at least one of a general descriptor parameter, an input descriptor parameter, an output descriptor parameter, a processing descriptor parameter, a requirement descriptor parameter, a client assistance descriptor parameter, a failover descriptor parameter, a monitoring descriptor parameter or a reporting descriptor parameter.

The 360-degree VR image parameters may include a configuration parameter, and the configuration parameter may include at least one of a media parameter, a feature parameter, a camera parameter, a projection parameter, a stitching parameter or a cloud parameter. The cloud parameter may indicate a computer resource necessary to perform the image stitching workflow, and the number of media processing entities may be determined according to the cloud parameter.

By converting several images synchronized in a camera to one stitched 360-degree VR images, it is possible to provide a three degrees of freedom (3DoF) to a user. However, when a large amount of data is included in 3DoF 360 content, it is difficult to process the 3DoF 360 content in a standalone server. Therefore, it is possible to solve the above problem according to network based image stitching based on a plurality of processing entities.

In the above-described embodiments, the methods are described based on the flowcharts with a series of steps or units, but the present invention is not limited to the order of the steps, and rather, some steps may be performed simultaneously or in different order with other steps. In addition, it should be appreciated by one of ordinary skill in the art that the steps in the flowcharts do not exclude each other and that other steps may be added to the flowcharts or some of the steps may be deleted from the flowcharts without influencing the scope of the present invention.

The embodiments include various aspects of examples. All possible combinations for various aspects may not be described, but those skilled in the art will be able to recognize different combinations. Accordingly, the present invention may include all replacements, modifications, and changes within the scope of the claims.

The embodiments of the present invention may be implemented in a form of program instructions, which are executable by various computer components, and recorded in a computer-readable recording medium. The computer-readable recording medium may include stand-alone or a combination of program instructions, data files, data structures, etc. The program instructions recorded in the computer-readable recording medium may be specially designed and constructed for the present invention, or well-known to a person of ordinary skilled in computer software technology field. Examples of the computer-readable recording medium include magnetic recording media such as hard disks, floppy disks, and magnetic tapes; optical data storage media such as CD-ROMs or DVD-ROMs; magneto-optimum media such as floptical disks; and hardware devices, such as read-only memory (ROM), random-access memory (RAM), flash memory, etc., which are particularly structured to store and implement the program instruction. Examples of the program instructions include not only a machine language code formatted by a compiler but also a high level language code that may be implemented by a computer using an interpreter. The hardware devices may be configured to be operated by one or more software modules or vice versa to conduct the processes according to the present invention.

Although the present invention has been described in terms of specific items such as detailed elements as well as the limited embodiments and the drawings, they are only provided to help more general understanding of the invention, and the present invention is not limited to the above embodiments. It will be appreciated by those skilled in the art to which the present invention pertains that various modifications and changes may be made from the above description.

Therefore, the spirit of the present invention shall not be limited to the above-described embodiments, and the entire scope of the appended claims and their equivalents will fall within the scope and spirit of the invention.

What is claimed is:

1. A method of creating an image stitching workflow, the method comprising:
　　acquiring 360-degree virtual reality (VR) image workflow descriptors necessary to make a request for image stitching and create the image stitching workflow;
　　acquiring function descriptors applicable to the image stitching workflow from a function registry;
　　creating the image stitching workflow based on the function descriptors selected from the function registry;
　　determining configurations of media processing entities necessary to perform tasks for the image stitching workflow based on the 360-degree VR image workflow descriptors;
　　configuring a plurality of media processing entities according to the configurations of media processing entities; and
　　allocating the tasks configuring the image stitching workflow to the plurality of media processing entities,
　　wherein the function descriptors include configuration parameters, and
　　wherein the configuration parameters include a feature parameter, a camera parameter, a projection parameter, and a stitching parameter,
　　wherein the feature parameter includes a feature extraction method parameter indicating a method to extract features,
　　wherein the camera parameter includes at least one of a focal length parameter, a principal point parameter, a camera skew value parameter, or a camera transformation parameter,
　　wherein the projection parameter includes a projection type parameter, and
　　wherein the stitching parameter includes at least one of a seam position parameter or a seam mask parameter.

2. The method according to claim 1, further comprising:
　　determining configuration information of a current task configuring the image stitching workflow and transmitting the configuration information of the current task to a task manager; and acquiring, from the task manager, access information of a next task performed immediately after the current task, when configuration of the current task is confirmed by the task manager.

3. The method according to claim 2, further comprising, when a content-dependent parameter according to content among the 360-degree VR workforce descriptors is changed, updating configuration information of a task according to the changed content-dependent parameter.

4. The method according to claim 1, wherein, when it is requested to stop the image stitching workflow, the acquiring of the 360-degree VR image workflow descriptors to the allocating of the tasks configuring the image stitching workflow to the plurality of media processing entities are stopped.

5. The method according to claim 1, wherein the tasks configuring the image stitching workflow include:
 decoding an encoded raw image;
 extracting a feature point of the decoded raw image;
 extracting a camera parameter based on the feature point;
 generating a 360-degree VR image, by projecting the decoded raw image onto a projection object based on the camera parameter;
 determining seam information of the 360-degree VR image based on the camera parameter;
 postprocessing the 360-degree VR image based on the seam information; and
 encoding the postprocessed 360-degree VR image.

6. The method according to claim 1, wherein the 360-degree VR image workflow descriptors include at least one of a general descriptor parameter, an input descriptor parameter, an output descriptor parameter, a processing descriptor parameter, a requirement descriptor parameter, a client assistance descriptor parameter, a failover descriptor parameter, a monitoring descriptor parameter or a reporting descriptor parameter.

7. An image stitching workflow creation apparatus for creating an image stitching workflow, the image stitching workflow apparatus comprising one or more processors and one or more memory devices,
 wherein the one or more processors perform one or more instructions of a program for creating the image stitching workflow stored in the one or more memory devices,
 wherein the one or more memory devices stores the program for creating the image stitching workflow, and
 wherein the one or more instructions include:
 acquiring 360-degree virtual reality (VR) image workflow descriptors necessary to make a request for image stitching and create the image stitching workflow;
 acquiring function descriptors applicable to the image stitching workflow from a function registry;
 creating the image stitching workflow based on the function descriptors selected from the function registry;
 determining configurations of media processing entities necessary to perform tasks for the image stitching workflow based on the 360-degree VR image workflow descriptors;
 configuring a plurality of media processing entities according to the configurations of media processing entities; and
 allocating the tasks configuring the image stitching workflow to the plurality of media processing entities, wherein the function descriptors include configuration parameters, and
 wherein the configuration parameters include a feature parameter, a camera parameter, a projection parameter, and a stitching parameter,
 wherein the feature parameter includes a feature extraction method parameter indicating a method to extract features,
 wherein the camera parameter includes at least one of a focal length parameter, a principal point parameter, a camera skew value parameter, or a camera transformation parameter,
 wherein the projection parameter includes a projection type parameter, and
 wherein the stitching parameter includes at least one of a seam position parameter or a seam mask parameter.

8. The image stitching workflow creation apparatus according to claim 7, wherein the one or more instructions include:
 determining configuration information of a current task configuring the image stitching workflow and transmitting the configuration information of the current task to a task manager; and
 acquiring, from the task manager, access information of a next task performed immediately after the current task, when successful configuration of the current task is confirmed by the task manager.

9. The image stitching workflow creation apparatus according to claim 8, wherein the one or more instructions include, when a content-dependent parameter according to content among the 360-degree VR workflow descriptors is changed, updating configuration information of a task according to the changed content-dependent parameter.

10. The image stitching workflow creation apparatus according to claim 7, wherein, when it is requested to stop the image stitching workflow, the performing of the one or more instructions is stopped.

11. The image stitching workflow creation apparatus according to claim 7, wherein the tasks configuring the image stitching workflow include:
 decoding an encoded raw image;
 extracting a feature point of the decoded raw image;
 extracting a camera parameter based on the feature point;
 generating a 360-degree VR image, by projecting the decoded raw image onto a projection object based on the camera parameter;
 determining seam information of the 360-degree VR image based on the camera parameter;
 postprocessing the 360-degree VR image based on the seam information; and
 encoding the postprocessed 360-degree VR image.

12. The image stitching workflow creation apparatus according to claim 7, wherein the 360-degree VR image workflow descriptors include at least one of a general descriptor parameter, an input descriptor parameter, an output descriptor parameter, a processing descriptor parameter, a requirement descriptor parameter, a client assistance descriptor parameter, a failover descriptor parameter, a monitoring descriptor parameter or a reporting descriptor parameter.

* * * * *